(12) United States Patent
Krauthamer et al.

(10) Patent No.: US 11,420,578 B2
(45) Date of Patent: Aug. 23, 2022

(54) RIDER MONITORING USING DEPTH SENSOR

(71) Applicant: Universal City Studios LLC, Universal City, CA (US)

(72) Inventors: Akiva Meir Krauthamer, Orlando, FL (US); Timothy Fitzgerald Garnier, Orlando, FL (US); Matthew Sean Pearse, Orlando, FL (US); Yu-Jen Lin, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 194 days.

(21) Appl. No.: 16/827,113

(22) Filed: Mar. 23, 2020

(65) Prior Publication Data

US 2021/0268984 A1 Sep. 2, 2021

Related U.S. Application Data

(60) Provisional application No. 62/984,092, filed on Mar. 2, 2020.

(51) Int. Cl.
| | |
|---|---|
| *B60R 21/015* | (2006.01) |
| *A63G 25/00* | (2006.01) |
| *G01S 17/88* | (2006.01) |
| *G01S 13/88* | (2006.01) |

(52) U.S. Cl.
CPC ........ *B60R 21/01534* (2014.10); *A63G 25/00* (2013.01); *G01S 13/88* (2013.01); *G01S 17/88* (2013.01)

(58) Field of Classification Search
CPC ......... A63G 31/00; G01S 17/06; G01S 13/56; G01S 17/08; G01S 17/88; G08B 21/22; B60R 21/01534
See application file for complete search history.

(56) References Cited

U.S. PATENT DOCUMENTS

| | | | |
|---|---|---|---|
| 5,118,134 A | 6/1992 | Mattes et al. | |
| 5,330,226 A * | 7/1994 | Gentry | G01V 8/10 280/735 |
| 5,785,347 A * | 7/1998 | Adolph | B60R 21/01556 180/273 |
| 6,007,095 A | 12/1999 | Stanley | |

(Continued)

OTHER PUBLICATIONS

PCT/US2021/020310 International Search Report and Written Opinion dated Jun. 11, 2021.

*Primary Examiner* — James A English
(74) *Attorney, Agent, or Firm* — Fletcher Yoder P.C.

(57) ABSTRACT

An attraction system includes a sensor configured to emit an output signal toward a guest area and receive a reflected signal from the guest area and a control system communicatively coupled to the sensor. The control system is configured to receive data from the sensor, in which the data is indicative of a distance of signal travel based on the output signal and the reflected signal. The control system is also configured to compare the distance of signal travel with an unoccupied distance value corresponding to a distance between the sensor and the guest area being unoccupied, and determine whether the guest area is occupied based on comparing a difference between the distance of signal travel and the unoccupied distance value with a threshold.

17 Claims, 5 Drawing Sheets

(56) References Cited

U.S. PATENT DOCUMENTS

| | | | |
|---|---|---|---|
| 6,116,640 A * | 9/2000 | Tanaka | G06K 9/00362 |
| | | | 280/735 |
| 6,302,438 B1 | 10/2001 | Stopper, Jr. et al. | |
| 6,507,779 B2 | 1/2003 | Breed et al. | |
| 9,914,428 B2 | 3/2018 | Zamperla | |
| 2003/0159300 A1 | 8/2003 | Moss et al. | |
| 2009/0280915 A1 | 11/2009 | Shipley | |
| 2015/0336013 A1 | 11/2015 | Stenzler et al. | |
| 2015/0339910 A1 | 11/2015 | Stenzler | |
| 2018/0038949 A1* | 2/2018 | Cha | G01S 13/5244 |
| 2018/0361974 A1 | 12/2018 | Le et al. | |
| 2019/0220634 A1 | 7/2019 | Cossairt et al. | |
| 2019/0347911 A1 | 11/2019 | Linguanti et al. | |
| 2019/0379467 A1* | 12/2019 | Neumeier | H04B 17/30 |
| 2020/0029069 A1 | 1/2020 | Goergen et al. | |

* cited by examiner

US 11,420,578 B2

RIDER MONITORING USING DEPTH SENSOR

CROSS REFERENCE TO RELATED APPLICATIONS

This application claims priority from and the benefit of U.S. Provisional Application Ser. No. 62/984,092, entitled "RIDER MONITORING USING DEPTH SENSOR" and filed Mar. 2, 2020, which is hereby incorporated by reference in its entirety for all purposes.

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

Amusement parks, also referred to as theme parks, include various features that each provides a unique experience for guests of the amusement park. For example, the amusement park may include different attraction systems, such as a roller coaster, a motion simulator, a drop tower, a performance show, a log flume, and so forth. For some of the attraction systems, guests are positioned within a contained area, such as a ride vehicle. However, it may be difficult to determine the occupancy of the contained area. As an example, it may be tedious for a user, such as an operator of the attraction system, to manually count the number of guests within the contained area.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an attraction system includes a sensor configured to emit an output signal toward a guest area and receive a reflected signal from the guest area and a control system communicatively coupled to the sensor. The control system is configured to receive data from the sensor, in which the data is indicative of a distance of signal travel based on the output signal and the reflected signal. The control system is also configured to compare the distance of signal travel with an unoccupied distance value corresponding to a distance between the sensor and the guest area being unoccupied, and determine whether the guest area is occupied based on comparing a difference between the distance of signal travel and the unoccupied distance value with a threshold.

In an embodiment, an attraction system includes a ride vehicle configured to travel along a ride path of the attraction system, a sensor configured to emit an output signal toward the ride vehicle and receive a reflected signal, and a control system communicatively coupled to the sensor. The control system is configured to receive data from the sensor, in which the data is based on the output signal and the reflected signal. The control system is also configured to determine a current distance between the sensor and the ride vehicle based on the data, compare the current distance with an unoccupied distance spanning between the ride vehicle and the sensor when the ride vehicle is unoccupied, and determine whether the ride vehicle is occupied based on the comparison between the current distance and the unoccupied distance.

In an embodiment, a non-transitory computer-readable medium includes executable instructions. The instructions, when executed by a processor, are configured to cause the processor to operate an attraction system in a calibration mode to determine an unoccupied distance spanning between a sensor of the attraction system and a guest area of the attraction system when the guest area is unoccupied, operate the attraction system in an operating mode to determine a current distance spanning between the sensor or a separate sensor and the guest area, compare the current distance with the unoccupied distance, and determine whether the guest area is occupied in the operating mode of the attraction system based on the comparison between the current distance and the unoccupied distance.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
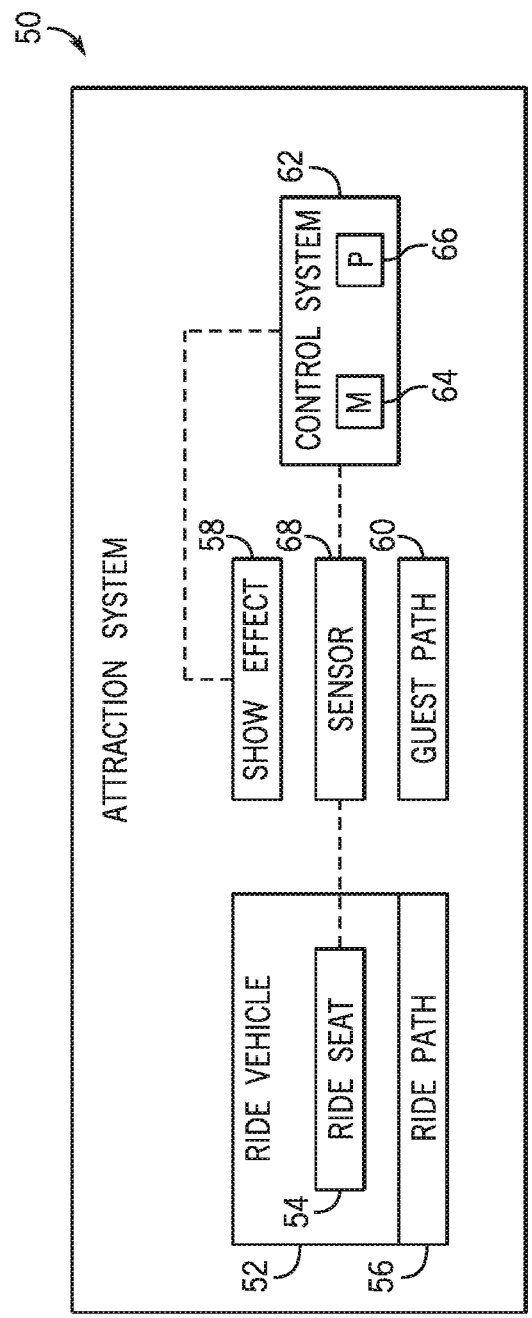
FIG. 1 is a schematic diagram of an embodiment of an attraction system, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure relates to systems and methods for determining an occupancy of an attraction. For example, the attraction may include any of various amusement park features, such as a roller coaster, a performance show, a water ride, an augmented reality ride or experience, and the like. The attraction may accommodate a number of guests and may include a variety of features to entertain such guests. In an example, the attraction may include a guest area, such as seating in a ride vehicle in which guests are secured, and the ride vehicle may travel along a path. In another example, the attraction may include a guest area, such as a theater-like seating arrangement in which guests are positioned, and the guest area may remain stationary while the attraction is in operation.

It may be beneficial to determine the occupancy of the attraction, such as to determine the number of guests in the attraction, to determine a securement of the guests in the ride vehicle, and so forth. However, it may be difficult or tedious to determine the position of the guests within the attraction in order to determine the attraction's occupancy. As an example, it may be difficult to count the number of guests in the attraction across different times of operation of the attraction. As another example, it may be difficult to monitor the positioning of the guests within the attraction, such as to determine whether the guests are sufficiently secured in the ride vehicle.

It is presently recognized that a system configured to determine the occupancy of guests may improve operation of the attractions. Accordingly, embodiments of the present disclosure are directed to a system configured to determine a distance between an area in which guests may be located and another part of the attraction to determine whether the area is occupied by the guests. For example, the system may include a sensor configured to emit signals to the guest area and receive signals that have reflected off a part of the guest area. The received signals may indicate a distance between the sensor and the part of the area. If the area is unoccupied, the emitted signal extend through an entirety of the part of the area, and the received signal may therefore indicate a first distance spanning from the sensor to the area. However, if the area is occupied, the emitted signal may be blocked by the guests before extending through the entirety of the area. Therefore, the received signal may indicate a second distance spanning from the sensor to the guests, and the second distance may be shorter than the first distance. In this manner, the distances indicated by received signals may be used for determining the occupancy of the area, such as based on a comparison with a reference distance indicative of an unoccupied area without guests. Indeed, in an embodiment, a system operates to emit signals toward the guest area and receive the reflected signals back from the guest area to facilitate identifying whether guests are present and/or properly secured within the guest area. For example, signals directed to the guest area may be reflected back from the guest area by a guest in that area and/or by a seating structure in that area. Characteristics of the reflected signal, as detected by the system, may facilitate determining occupancy and/or securement information.

With the preceding in mind, FIG. 1 is a schematic diagram of an embodiment of an attraction system 50, which may be a roller coaster, a dark ride, a drop tower, or any other suitable attraction system 50. The attraction system 50 may have a ride vehicle 52 in which guests may be positioned during operation of the attraction system 50. For example, the ride vehicle 52 may have one or more ride seats 54 that guests may occupy within the ride vehicle 52. In one embodiment, the ride vehicle 52 may be configured to travel along a ride path 56. The ride path 56 may be a track that guides the ride vehicle 52 through the attraction system 50, and/or the ride path 56 may include an open surface through which the ride vehicle 52 may generally travel (e.g., the ride vehicle 52 may be guided based on a user input). In an additional or alternative embodiment, the attraction system 50 may not have the ride path 56. Rather, the ride vehicle 52 may remain stationary within the attraction system 50 during operation, such as for a theatrical show. Indeed, the ride vehicle 52 may alternatively be any suitable guest area of the attraction system 50 in which guests may be situated during operation of the attraction system 50.

The attraction system 50 may also include show effects 58 that further enhance the experience of the guests. The show effects 58 may include lighting, sounds, animated figures, and the like, that provide additional features to entertain the guests. In an embodiment, the attraction system 50 may also include a guest path 60 that guests may use to navigate through the attraction system 50, such as from an entrance of the attraction system 50 to the ride vehicle 52 and/or from the ride vehicle 52 to an exit of the attraction system 50. As an example, the guest path 60 may include a footpath (e.g., a queue), a staircase, an escalator, an elevator, and so forth. The show effects 58 may entertain the guests as they navigate the guest path 60 in the attraction system 50 such that the guests may also be entertained while waiting within the attraction system 50 (e.g., when not in the ride vehicle 52).

In an embodiment, the attraction system 50 may include and/or be communicatively coupled with a control system 62. The control system 62 may include a memory 64 and a processor 66, such as a microprocessor. The memory 64 may include volatile memory, such as random access memory (RAM), and/or non-volatile memory, such as read-only memory (ROM), optical drives, hard disc drives, solid-state drives, or any other non-transitory computer-readable medium that includes instructions to operate the attraction system 50, such as the show effects 58. The processor 66 may include one or more application specific integrated circuits (ASICs), one or more field programmable gate arrays (FPGAs), one or more general purpose processors, or any combination thereof, configured to execute the instructions stored in the memory 64 to control the attraction system 50. In one embodiment, the control system 62 may be configured to receive a user input to operate the attraction system 50. For instance, the control system 62 may include a user interface with which a user, such as an operator and/or a guest of the attraction system 50, may interact to operate the attraction system 50. In an additional or alternative embodiment, the control system 62 may automatically operate the attraction system 50 without receiving the user input. By way of example, the control system 62 may be communicatively coupled to one or more sensors 68. The sensor(s) 68 may be configured to monitor an operating parameter of the attraction system 50, and the sensor(s) 68 may transmit data (e.g., sensor data) indicative of the operating parameter to the control system 62. For example, the sensor(s) 68 may include individual systems of one or more emitters and detectors that operate together to detect objects or portions of objects (e.g., a seat back), including identifying measurements, such as distance to the objects, size of the objects, relative spacing of the objects, and so forth. The sensor(s) 68 may include wave-based technology, such as light emitters and detectors that cooperate with a processor to correlate detections with measurements to provide data. The control system 62 may then operate the attraction system 50 based on the data.

As an example, the sensor(s) 68 may be configured to monitor an operating parameter associated with occupancy of the ride vehicle 52. In particular, the sensor(s) 68 may determine whether the guests are occupying the ride seat(s) 54 of the ride vehicle 52. The control system 62 therefore operates the attraction system 50 based on the occupancy of the ride vehicle 52. For instance, the control system 62 may activate certain show effects 58 based on the number of detected guests in the ride vehicle 52. Additionally or alternatively, the control system 62 may store information (e.g., in the memory 64) associated with the number of detected guests in the ride vehicle 52. By way of example, the control system 62 may monitor the number of guests that go through the attraction system 50 over a period of time. The control system 62 may then store such information, which may be used for determining the popularity of the attraction system 50, a guest capacity over a time of operation, and the like.

Figure 2:
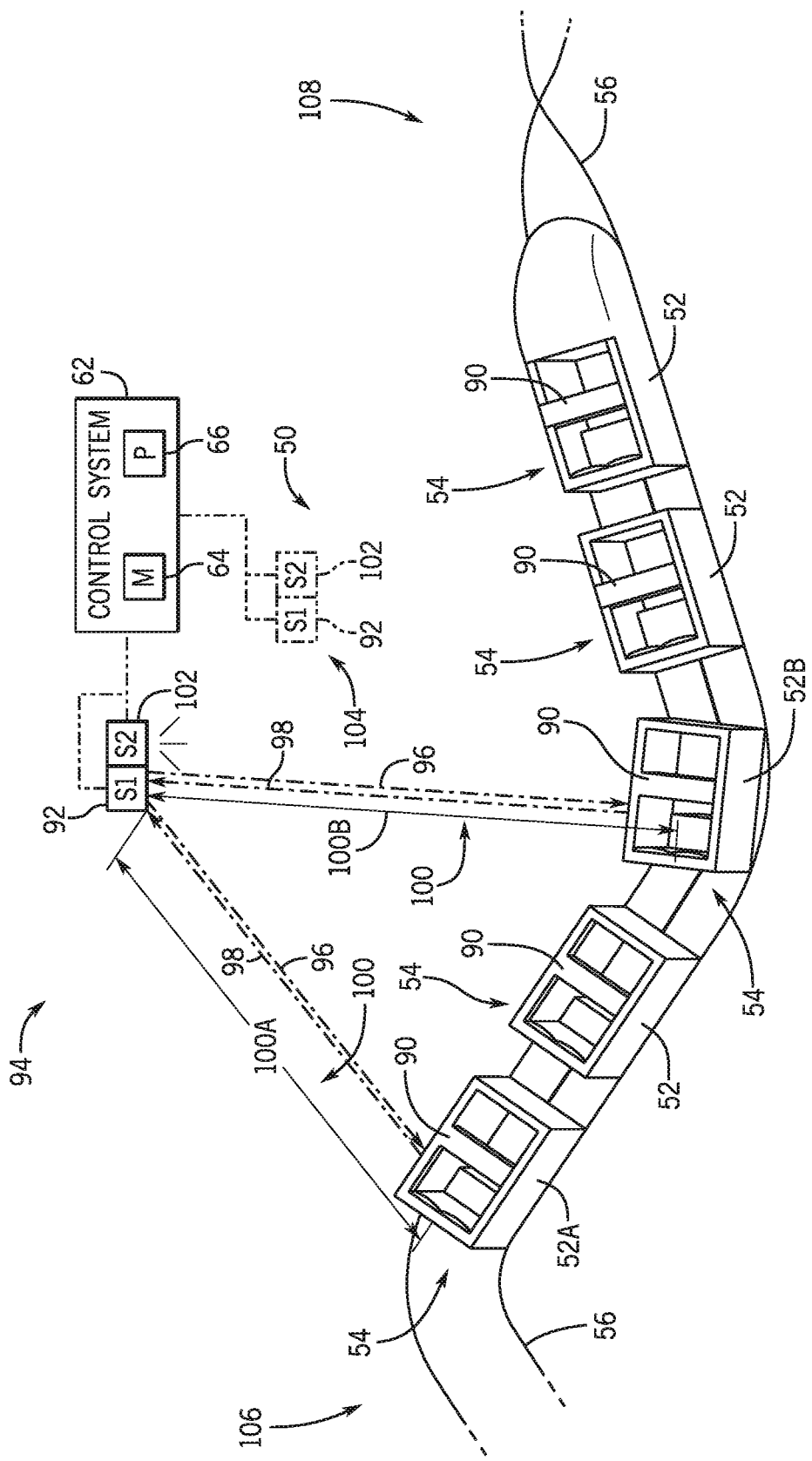
FIG. 2 is a side perspective view of an embodiment of an attraction system in a calibration mode, in accordance with an aspect of the present disclosure.

FIG. 2 is a side perspective view of an embodiment of the attraction system 50. In the illustrated embodiment, the attraction system 50 includes multiple ride vehicles 52 coupled together (e.g., via a link) and configured to travel along the ride path 56. The illustrated ride path 56 may be a track that guides the movement (e.g., direction, speed, and/or orientation) of the ride vehicle 52 through the attraction system 50. Each ride vehicle 52 also includes one or more ride seats 54 that each may hold one or more guests of the attraction system 50. As an example, each ride seat 54 may include a restraint 90, such as a lap bar, configured to secure the guests within the ride vehicles 52 as the ride vehicles 52 move along the ride path 56 during operation of the attraction system 50.

Furthermore, the attraction system 50 may include the control system 62, which may be configured to determine an occupancy of the ride vehicles 52 via a first sensor 92 that is communicatively coupled to the control system 62. For example, the first sensor 92 may be located at a first position 94 within the attraction system 50 and may be configured to determine a distance between the ride seats 54 and the first sensor 92. In one embodiment, the first sensor 92 may be configured to emit output signals 96 away from the first position 94 through the attraction system 50, and the output signals 96 may reflect off any physical object (e.g., the ride vehicles 52) as reflected signals 98 and return toward the first sensor 92. That is, the output signals 96 and the reflected signals 98 may be the same signal that travels along a path from the first sensor 92 to the physical object, and then deflected off the physical object to return from the physical object to the first sensor 92. In other words, the output signal 96 refers to such signal at the portion of the path traveling from the first sensor 92 to the physical object, and the reflected signal 98 refers to the same signal at the portion of the path traveling from the physical object to the first sensor 92.

The first sensor 92 may receive the reflected signals 98 and transmit data associated with the reflected signals 98 to the control system 62 for further processing. By way of example, the first sensor 92 may be a light detection and ranging (LIDAR) device, a sound navigation ranging (sonar) device, a radio detection and ranging (radar) device, an infrared remote sensing device, another suitable device, or any combination thereof, configured to emit and receive signals 96, 98 between the first sensor 92 and another part of the attraction system 50. Indeed, the particular device used may be based on the application of the attraction system 50, such as whether certain show effects (e.g., fog, light) may interfere with the signals 96, 98. The control system 62 may receive data associated with the output signals 96 and the corresponding reflected signals 98 from the first sensor 92, and the control system 62 may determine a distance between the first sensor 92 and the physical object based on the data. For example, the data may include a time associated with receiving one of the reflected signals 98 after emitting a corresponding output signal 96, a wavelength of the reflected signals 98, an angle of the path traveled by the reflected signal 98 to return to the first sensor 92, another suitable parameter associated with the signals 96, 98, or any combination thereof, indicative of a distance of signal travel for the signals 96, 98 between the first sensor 92 and the physical object. The control system 62 may determine the distance between the first sensor 92 and the physical object based on the distance of signal travel.

The first sensor 92 may therefore be used to determine the distance between the first sensor 92 and the ride seats 54 of the ride vehicles 52. For instance, the first sensor 92 may be positioned such that the output signals 96 may be uninterruptedly emitted (i.e., not blocked by other physical objects of the attraction system 50) to the ride seats 54, and the reflected signals 98 may be uninterruptedly received by the first sensor 92. Based on the determined distance between the first sensor 92 and the ride seats 54, the control system 62 may determine whether the ride vehicles 52 are occupied or unoccupied. For example, a distance between an occupied ride seat 54 and the first sensor 92, in which the output signal 96 may fully extend into the ride seat 54, may be greater than a distance between an occupied ride seat 54 and the first sensor 92, in which the output signal 96 may be blocked by a guest before fully extending into the ride seat 54 (i.e., the output signal 96 may merely partially extend into the ride seat 54). In this way, the control system 62 may determine whether the value of a determined distance between the ride seat 54 and the first sensor 92 matches with a distance corresponding to an unoccupied ride seat 54 or with a distance corresponding to an occupied ride seat 54. It should be noted that distances relative to specific areas (e.g., a base and/or back of the ride seat 54) may be determined to facilitate analysis in accordance with present embodiments. Further, distances relative to restraints (e.g., a lap bar) may also be detected to facilitate determining whether the restraint is properly engaged in addition to the ride seat 54 being occupied.

To this end, the control system 62 may operate the attraction system 50 in a calibration mode to determine baseline distance values associated with unoccupied ride seats 54. In the calibration mode, the control system 62 may operate the ride vehicles 52, such as by moving the ride vehicles 52 along the ride path 56, without any guests positioned within the ride seats 54. Furthermore, the first sensor 92 may operate and emit output signals 96 toward the ride vehicles 52 and to the unoccupied ride seats 54 during the calibration mode. The control system 62 may receive data associated with the output signals 96 and the resulting reflected signals 98 and, based on the data, the control system 62 may determine an unoccupied distance 100 spans between the unoccupied ride seats 54 and the first sensor 92. The unoccupied distance(s) 100 may include detection of the restraint 90 while the ride vehicle 52 is unoccupied. For example, an area of the ride seat 54 that is unobstructed (e.g., with respect to the first sensor 92) by the restraint 90 may be observed to identify a first unoccupied distance 100A and an area where the restraint 90 demonstrates engagement may be monitored to identify a second unoccupied distance 100B. Both distances may be used for calibration and, in combination with subsequent measures, may identify whether a rider is not only present but whether the rider is properly restrained.

In an embodiment, the first sensor 92 may simultaneously emit multiple output signals 96 in various directions, such as toward a first ride vehicle 52A and also toward a second ride vehicle 52B. The first ride vehicle 52A, which is located in a first part of the attraction system 50 (e.g., at a first section of the ride path 56), may be positioned at a different distance away from the first sensor 92 than that associated with the second ride vehicle 52B, which is located at a second part of the attraction system 50. Thus, the first sensor 92 may receive respective reflected signals 98 corresponding to the first ride vehicle 52A and the second ride vehicle 52B, and the control system 62 may therefore determine separate unoccupied distances 100 spanning between unoccupied ride seats 54 of different ride vehicles 52 and the first sensor 92. In other words, the control system 62 may determine a first unoccupied distance 100A spans between the unoccupied first ride vehicle 52A and the first sensor 92, and a second unoccupied distance 100B, different from the first unoccupied distance 100A, spans between the unoccupied second ride vehicle 52B and the first sensor 92. Indeed, the control system 62 may associate multiple unoccupied distances 100 with respectively unoccupied ride vehicles 52. In an additional or alternative embodiment, the first sensor 92 may be configured to emit output signals 96 to a single part of the attraction system 50, such as toward a single point on the ride path 56, in the calibration mode. Each ride vehicle 52 traveling along the ride path 56 may intersect with the single point on the ride path 56 at different times and generally, at the single point, each ride vehicle 52 may be positioned at substantially the same distance away from the first sensor 92. Therefore, the data transmitted by the first sensor 92 may be indicative of a single unoccupied distance 100 spanning between the unoccupied ride vehicles 52 and the first sensor 92. Further, the first sensor 92 may emit output signals such that different locations of the same seating area are monitored (e.g., one for occupancy and one for restraint securement). Further, the first sensor 92 may be representative of multiple sensing devices that coordinate to perform such monitoring. In any case, the control system 62 may store the unoccupied distance(s) 100 determined via the calibration mode of the attraction system 50, such as within the memory 64, and the unoccupied distance(s) 100 may be retrieved and/or referenced at a later time.

During operation of the attraction system 50, the unoccupied distance(s) 100 may be used to determine whether the ride vehicles 52 are occupied. By way of example, the first sensor 92 may continue to emit and receive signals 96, 98 during operation of the attraction system 50, and the control system 62 may constantly receive data to determine the distance between the first sensor 92 and the ride vehicles 52. The control system 62 may then compare the determined distances with the stored unoccupied distance(s) 100 to determine whether the ride vehicles 52 are occupied or unoccupied. For instance, the control system 62 may determine whether the determined distances substantially match with the unoccupied distance(s) 100 to indicate that one of the ride vehicles 52 is unoccupied, or whether the determined distances do not substantially match with (e.g., the determined distances are less than) the unoccupied distance(s) 100 to indicate that one of the ride vehicles 52 is occupied by a guest. As previously discussed, similar operation can be performed for identifying whether restraints (e.g., a lap bar) are properly positioned.

Although the illustrated first sensor 92 is coupled above the ride vehicles 52, the first sensor 92 may be positioned at any suitable location within the attraction system 50 to enable the signals 96, 98 to be transmitted between the ride seats 54 and the first sensor 92. For example, the first sensor 92 may be positioned on the ride vehicle 52, on part of the ride path 56, and the like. Further, in an embodiment, the first sensor 92 may be fixedly coupled to the first position 94, such as by attaching to a stationary structure (e.g., a support of the ride path 56) within the attraction system 50. As such, the first sensor 92 may substantially remain in the first position 94 during operation of the attraction system 50.

Additionally or alternatively, the first sensor 92 may be configured to move within the attraction system 50. For example, the first sensor 92 may be coupled to a device that is movable within the attraction system 50 so as to follow the ride vehicles 52 and/or be guided by a user (e.g., away from physical show effects or features within the attraction system 50) in order to emit and receive signals 96, 98 uninterruptedly. Movement of the first sensor 92 relative to the ride vehicles 52 may change the distances between the first sensor 92 and the ride vehicles 52. Moreover, during operation, the ride vehicles 52 may move at elevated speeds and/or complex movements (e.g., corkscrew or twisting) that may cause difficulty for the signals 96, 98 to accurately indicate the distance between the ride vehicles 52 and the first sensor 92. For instance, the determined distance between one of the unoccupied ride vehicles 52 and the first sensor 92 may not substantially match the stored unoccupied distance 100 because the ride vehicle 52 may be oriented such that the output signals 96 emitted by the first sensor 92 may be transmitted to a side of the ride vehicle 52 instead of to the intended unoccupied ride seat 54. Thus, the determined distance may not accurately reflect the occupancy of the ride vehicle 52 because of the orientation of the ride vehicle 52 relative to the first sensor 92.

For this reason, the attraction system 50 may also include a second sensor 102, which may be rigidly coupled to the first sensor 92 such that a change in positioning of the first sensor 92 may cause a corresponding change in positioning of the second sensor 102. As used herein, positioning includes an orientation, a location, a pose, and/or a position. The second sensor 102 may be configured to determine the positioning of the ride vehicle 52 relative to the second sensor 102 and therefore relative to the first sensor 92. By way of example, the second sensor 102 may include an optical camera and/or another image sensing device, and the second sensor 102 may use machine vision to determine the positioning of the ride vehicle 52 relative to the first sensor 92 and vice versa. The second sensor 102 may also be communicatively coupled to the control system 62 and may transmit data indicative of the positioning of the ride vehicle 52 relative to the first sensor 92. Based on such data, the control system 62 may modify the unoccupied distance 100 accordingly. By way of example, after the unoccupied distance(s) 100 have been determined and stored in accordance to the first position 94 of the first sensor 92, the second sensor 102 may transmit data to the control system 62 and indicate that a relative distance between the first sensor 92 and the ride vehicle 52 has changed, such as the first sensor 92 moving to a second position 104 (as represented by elements 92 and 102 in dashed lines). The control system 62 may then update the stored unoccupied distance(s) 100 accordingly to reflect the location of the first sensor 92 at the second position 104. For instance, the control system 62 may determine that at the second position 104, the first sensor 92 is substantially closer to the ride vehicles 52 than the first sensor 92 was at the first position 94 and therefore, the control system 62 may reduce the unoccupied distance(s) 100. As such, while the first sensor 92 is at the second position 104, the control system 62 may compare subsequently determined distances indicated by the first sensor 92 with the updated reduced unoccupied distance(s) 100 associated with the second position 104, rather than the originally stored unoccupied distance(s) 100 associated with the first position 94, to accurately determine whether the ride vehicles 52 are occupied. If a second sensor 102 indicates the first sensor 92 has returned from the second position 104 back to the first position 94, the control system 62 may then update the unoccupied distance(s) 100 again (e.g., to the originally stored unoccupied distance[s]) and compare distances to the updated unoccupied distance(s) 100. The functionality of the first sensor 92 and the second sensor 102 may be provided by a single sensing device. However, the single sensing device may still be referred to as the first sensor 92 and the second sensor 102 based on the separate functionality. Further, in an alternative embodiment, relative positioning of the first sensor 92 and the ride vehicle 52 may be determined by the control system 62 based on models of the ride path 56 and positional data, thereby avoiding the use of additional sensing devices.

In one embodiment, the control system 62 may cause the first sensor 92 to emit output signals 96 when the ride vehicles 52 are determined to be within a certain range of the output signals 96, and the control system 62 may cause the first sensor 92 not to emit output signals 96 when the ride vehicles 52 are determined to be out of a certain range of the output signals 96. In other words, the control system 62 may selectively cause the first sensor 92 to emit output signals 96 at certain times, rather than to constantly emit the output signals 96, thereby reducing an energy consumption associated with operating the first sensor 92. By way of example, the control system 62 may determine a location of the ride vehicles 52 in the attraction system 50. The control system 62 may also store multiple locations (e.g., proximate to the first sensor 92) in which the control system 62 may activate the first sensor 92. Thus, in response to determining the ride vehicles 52 are at locations included in the stored locations, the control system 62 may activate the first sensor 92 to emit and receive signals 96, 98. However, upon determining the ride vehicles 52 are not at locations included in the stored locations, the control system 62 may suspend operation of the first sensor 92.

Although FIG. 2 discusses operating the attraction system 50 in a calibration mode in which the ride vehicle 52 may travel along an entirety of the ride path 56 without any passengers or guests to obtain unoccupied distances 100, in an additional or alternative embodiment, FIG. 2 may illustrate a portion of the ride path 56 where the ride vehicle 52 is unoccupied during normal operation of the attraction system 50 (i.e., operation of the attraction system 50 to entertain guests). For example, the illustrated portion of the ride path 56 is between an unloading area 106, where guests may exit the ride vehicle 52, and before a loading area 108, where guests may enter the ride vehicle 52. As such, during normal operation of the attraction system 50, the ride vehicle 52 may be occupied before the unloading area 106 and also after the loading area 108, but the ride vehicle 52 may be unoccupied after the unloading area 106 and before the loading area 108. In this way, the first sensor 92 may emit the output signals 96 toward the illustrated portion of the ride path 56 in order to acquire the unoccupied distances 100 without the attraction system 50 having to operate in the calibration mode that is different than normal operation. Accordingly, the unoccupied distances 100 may be acquired without interrupting flow through the attraction system 50 (e.g., by shutting down the attraction system 50 to operate in the calibration mode).

In one embodiment, the first sensor 92 may be configured to direct output signals 96 toward the illustrated portion of the ride path 56 to obtain unoccupied distances 100, and the first sensor 92 may be able to re-orient and/or re-position. Thus, the first sensor 92 may direct the output signals 96 toward a different portion of the ride path 56 where the ride vehicle 52 may be occupied to acquire additional distances (e.g., distances possibly indicating an occupied ride vehicle 52). The additional distances, such as after modification based on the second sensor 102, may then be compared with the unoccupied distances 100 to determine whether the ride vehicle 52 is occupied. In an additional or alternative embodiment, an additional first sensor 92 may be used to direct output signals 96 to the ride vehicle 52 at a different section of the ride path 56 to acquire the additional distances for comparison with the unoccupied distances 100. In any case, the unoccupied distances 100 may be obtained in an ongoing manner during normal operation of the attraction system 50.

Figure 3:
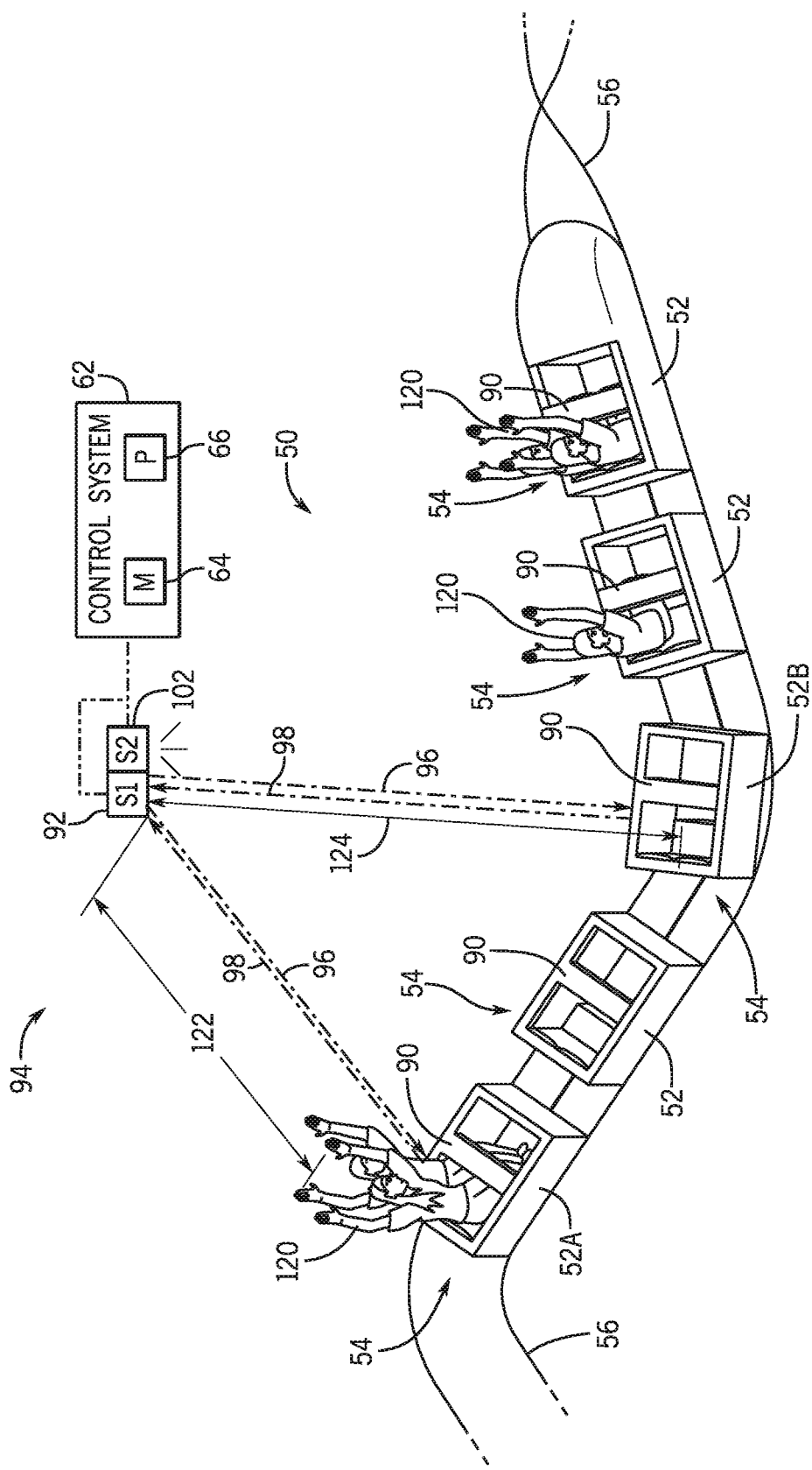
FIG. 3 is a side perspective view of the attraction system of FIG. 2 in an operating mode, in accordance with an aspect of the present disclosure.

FIG. 3 is a side perspective view of the attraction system 50 of FIG. 2 in which the ride vehicles 52 of the attraction system 50 are occupied by guests 120. In this way, the attraction system 50 may be in an operating mode to entertain the guests 120. For example, the control system 62 may operate the attraction system 50 in the operating mode after storing the unoccupied distance(s) in the calibration mode. During the operating mode, the control system 62 instructs the first sensor 92 to emit and receive signals 96, 98 to enable the control system 62 to determine whether the ride vehicles 52 are occupied.

In the illustrated embodiment, the first ride vehicle 52A is occupied with the guests 120. For this reason, the data transmitted by the first sensor 92 may indicate that a first distance 122 spanning between the first sensor 92 and the first ride vehicle 52A is less than the stored unoccupied distance, because the output signal 96 may reflect off the guests 120 rather than off the ride seat 54 (e.g., a seating portion or floor portion of the ride seat 54). The control system 62 may compare the first distance 122 with the stored unoccupied distance to determine whether the first ride vehicle 52A is occupied. In an example, the control system 62 may determine that the first distance 122 is less than the unoccupied distance 100 of FIG. 2 by greater than a threshold distance. As such, the control system 62 may determine that the first distance 122 indicates the first ride vehicle 52A is occupied.

However, the second ride vehicle 52B may not be occupied with guests 120. As a result, the data transmitted by the first sensor 92 may indicate that a second distance 124 spanning between the first sensor 92 and the first ride vehicle 52A is substantially the same as the stored unoccupied distance. That is, the control system 62 may determine that the second distance 124 does not deviate from the unoccupied distance 100 of FIG. 2 by greater than the threshold distance. Thus, the control system 62 may determine that the second distance 124 indicates the second ride vehicle 52B is unoccupied.

In FIGS. 2 and 3, a single first sensor 92 is implemented within the attraction system 50. However, in an alternative embodiment, multiple first sensors 92 may be implemented and used for determining the occupancy of the ride vehicles 52. As an example, the data received from each of the first sensors 92 may be compared with one another to determine the accuracy in the respectively determined distances between the first sensors 92 and the ride vehicles 52. Indeed, multiple pairs of first sensors 92 and second sensors 102 may be implemented to determine the occupancy of the ride vehicles 52 based on various respective positionings of the first sensors 92 relative to the ride vehicles 52.

Moreover, although the illustrated attraction system 50 in FIGS. 2 and 3 include a moving ride vehicle 52, the described approach for determining the occupancy of the attraction system 50 may be implemented for a stationary area in which the guests 120 may occupy. By way of example, the attraction system 50 may be a performance or theatrical show having seats that do not substantially move within the attraction system 50, but the first sensor 92 may still be used for determining the distance between the first sensors 92 and the seats.

Figure 4:
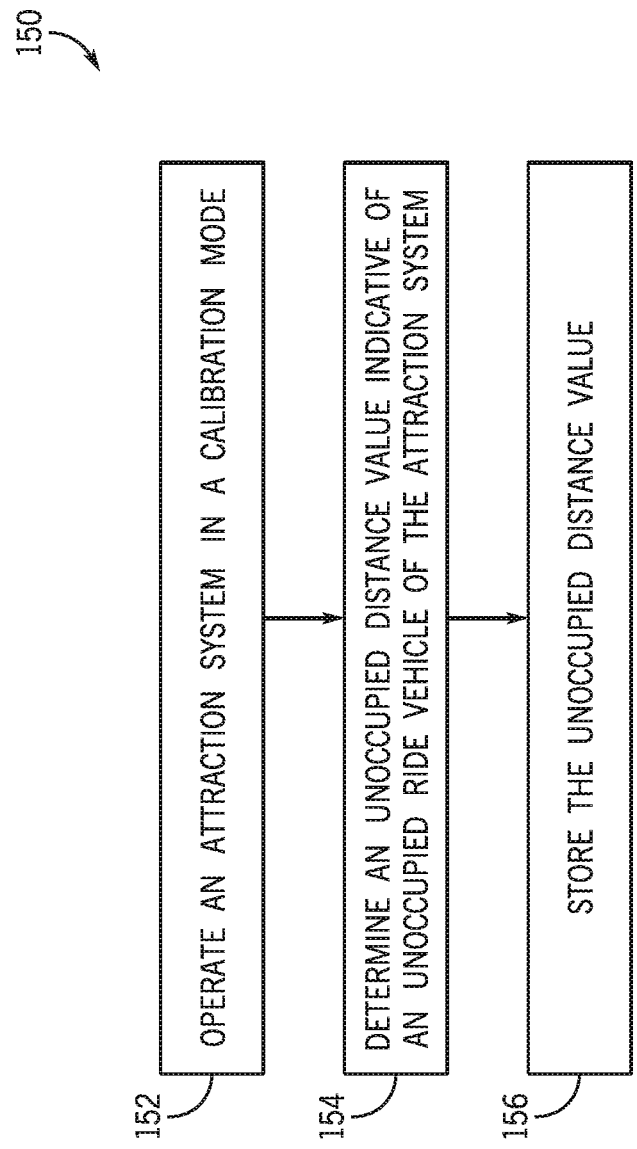
FIG. 4 is a flowchart of an embodiment of a method or process for operating an attraction system to determine an unoccupied distance, in accordance with an aspect of the present disclosure.
Figure 5:
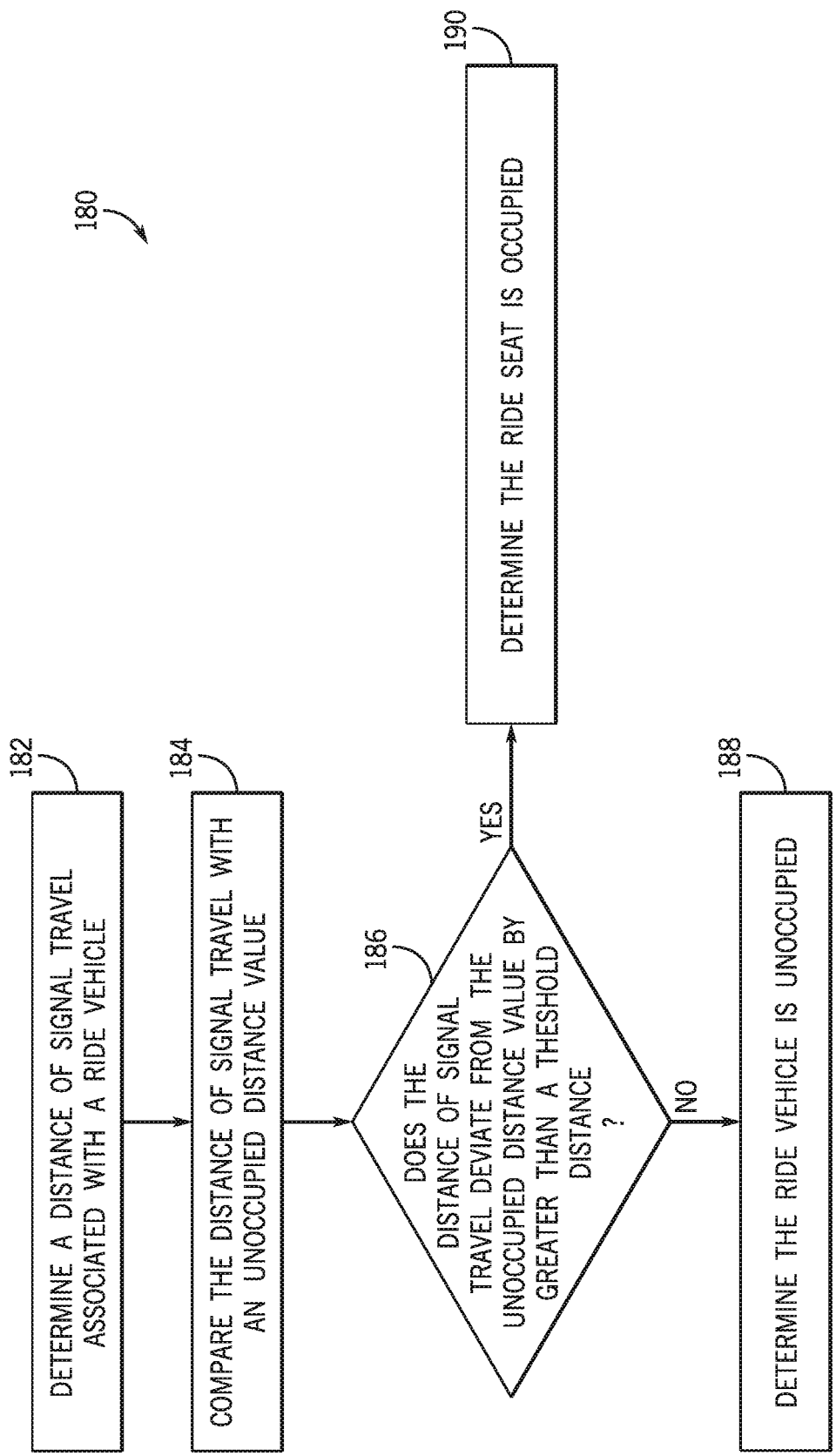
FIG. 5 is a flowchart of an embodiment of a method or process for determining occupancy of a ride vehicle, in accordance with an aspect of the present disclosure.

FIGS. 4 and 5 illustrate respective embodiments of a method or process for operating an attraction system, such as the attraction system 50 of FIGS. 2 and 3. The steps of each method may be performed by a single controller, such as the control system 62 (FIGS. 1-3), or multiple controllers may perform different steps of each method. It should also be noted that the steps of each method may be performed differently in another embodiment, such as for a different embodiment of the attraction system. For example, additional steps may be performed, or certain steps of each method may be modified, removed, or performed in a different order.

FIG. 4 is a flowchart of an embodiment of a method or process 150 for operating an attraction system to determine an unoccupied distance value. At block 152, the attraction system is operated in a calibration mode. During the calibration mode, unoccupied ride vehicles of the attraction system may be in operation to travel through the attraction system (e.g., via a ride path). This may be a segment of normal operation, which may assist with limiting measurement discrepancies and continual throughput for the attraction.

At block 154, an unoccupied distance value is determined during the calibration mode. For instance, the first sensor is instructed to emit output calibration signals toward the unoccupied ride vehicle and to receive corresponding reflected calibration signals. The first sensor may transmit calibration data that is based on the output calibration signals and reflected calibration signals. A resulting calibration distance between the first sensor and the unoccupied ride vehicle (e.g., a seat, a specific portion of a seat, a restraint in a desired position while the seat is unoccupied) may then be determined based on the calibration data. In an embodiment, multiple calibration distances may be determined for respective ride vehicles positioned at different locations within the attraction system. Additionally or alternatively, a single calibration distance may be determined and associated with all of the ride vehicles. In any case, the calibration distance determined via the calibration mode is stored as the unoccupied distance value, as indicated at block 156.

The frequency in which the steps of the method 150 are performed may vary based on the attraction system. In an example, the method 150 may be performed once per day such that accurate unoccupied distance value(s) are determined and updated every day. In another example, the method 150 may be performed once every time the attraction system is modified, such as after the ride vehicles (e.g., the ride seats) are modified and/or after show elements are changed. In any case, the method 150 may be performed at a suitable frequency to update and store accurate unoccupied distance value(s).

FIG. 5 is a flowchart of an embodiment of a method or process 180 for determining the occupancy of a ride vehicle. The method 180 may be performed during the operating mode of the attraction system and is performed after the method 150, such that a corresponding unoccupied distance value has been determined and is retrievable. At block 182, a distance of signal travel is determined. The distance of signal travel may indicate a current distance between the first sensor and the ride vehicle (e.g., a seat, a specific portion of a seat, a restraint in a desired position while the seat is unoccupied). For example, similar to the step described with reference to block 154 of FIG. 4, the first sensor may be instructed to emit output signals toward the ride vehicle and receive corresponding reflected signals, and the distance of signal travel may be determined based on a parameter of the reflected signals. The sensor may then transmit data indicative of the distance of signal travel.

At block 184, the distance of signal travel is compared with the unoccupied distance value, which may have been determined via the calibration mode. In a certain embodiment, the unoccupied distance value may be updated or modified based on a determined positioning of the first sensor relative to the ride vehicle. That is, the unoccupied distance value determined and stored via the calibration mode may be applicable at a first positioning of the first sensor relative to the ride vehicle. However, the first sensor may currently be at a second positioning relative to the ride vehicle (e.g., the first sensor was moved within the attraction system). Therefore, the initially determined unoccupied distance value may be updated to reflect the second positioning, and the updated unoccupied distance value may accurately reflect a distance between the unoccupied ride vehicle and the first sensor based on the second positioning. As such, the occupancy of the ride vehicle may be accurately determined based on the comparison between the distance of signal travel and the updated unoccupied distance value. In some embodiments, a calibration distance may be supplied to multiple sensors (e.g., the first sensor 92) throughout the ride path 56 and adjustments to the calibration distance may be made based on a model or known relative orientations of each sensor to the ride vehicle 52 when within monitoring range of the particular sensor.

At block 186, a determination is made regarding whether the distance of signal travel deviates from the unoccupied distance value by greater than a threshold distance. For example, the current distance between an occupied ride vehicle and the first sensor may be substantially less than the calibration distance between an unoccupied ride vehicle and the first sensor. As such, the determination may be made as to whether the distance of signal travel is substantially less than the unoccupied distance value (e.g., by an amount that is greater than the threshold distance). The threshold distance may be set based on a database of body metrics for standard body sizes and body characteristics. For example, a six inch threshold may be set based on a minimum human body thickness that would be positioned at the monitored location of a seat.

In response to a determination that the distance of signal travel does not deviate from the unoccupied distance value by greater than the threshold distance, a determination may be made that the ride vehicle is unoccupied, as shown at block 188. That is, the distance of signal travel substantially matches with the unoccupied distance value and therefore, the current distance between the ride vehicle and the sensor indicates that the ride vehicle is unoccupied. However, in response to a determination that the distance of signal travel does deviate from the unoccupied distance value by greater than the threshold distance, a determination may be made that the ride vehicle is occupied, as shown at block 190. By way of example, the distance of signal travel may be less than the unoccupied distance value by an amount greater than the threshold distance and therefore, the distance of signal travel indicates that the ride vehicle is occupied.

In one embodiment, further actions may be performed based on the comparison between the distance of signal travel with the unoccupied distance value. In an example, information regarding the occupancy of the ride vehicle may be stored. Such information may then be referenced at a later time to determine information regarding the attraction system. For example, the occupancy of the ride vehicle may be used to determine whether the attraction system is to be modified (e.g., to increase popularity of the attraction system).

In another example, based on the determined occupancy of the ride vehicle, operation of the attraction system may be modified. For instance, the operation of the attraction system may be suspended or terminated. Additionally or alternatively, the ride path taken by one of the ride vehicles may be modified based on the occupancy of the ride vehicle. That is, the ride vehicle may be configured to travel in a variety of manners through the attraction system, and a particular ride path may be selected based on the determined occupancy.

In a further example, additional information regarding the occupancy of the ride vehicle may be determined. For instance, during the calibration mode, further distances may be determined and stored in addition to the unoccupied distance value associated with an unoccupied ride vehicle. Such distances may include a first distance indicative that another object (e.g., a jacket, a bag) is in the ride vehicle without a guest. The object may be smaller than a typical guest such that the first distance does not deviate from the unoccupied distance value by greater than the threshold distance, but may still substantially deviate from the unoccupied distance value. Other stored distances may include a first set of distances that are indicative of the position of the guests. As an example, the first set of distances may indicate postures of the guest, such as a second distance indicative of a seated guest, a third distance indicative of a standing guest, a fourth distance indicative of a leaned over guest, and the like. As another example, the first set of distances may indicate how the guests are positioned relative to the ride vehicle, such as whether the guests are fully contained within the ride seat, whether part of the guest is not contained within the ride seat, whether multiple guests are positioned in a single ride seat (e.g., a child on a parent's lap), whether guests are moving within the ride seat (e.g., not fully secured within the ride seat), and so forth. Such information may then be used for determining improvements for securing guests within the ride vehicles. The stored distances may further include a second set of distances indicative of an attribute of the guests. By way of example, the second set of distances may indicate a height and/or a torso size of the guests. In this way, certain parameters or demographics of the guests, such as age, may be determined, and additional information regarding the occupancy of the attraction system may be used for improving the attraction system.

Further still, certain distances, such as an excessive distance that deviates from the unoccupied distance value by a substantial amount greater than the threshold distance (e.g., by an additional threshold distance greater than the threshold distance), may indicate that operation of a component (e.g., of the ride vehicle, of the first sensor, of the control system) in the attraction system is to be modified, such as for performing maintenance. In an embodiment, a notification may be output upon determination of the excessive distance to inform a user, such as an operator of the attraction system, of such information. For instance, the notification may include a visual output (e.g., a light), an audio output, a notification sent to a mobile device, another suitable notification, or any combination thereof.

Additionally, although the present disclosure primarily discusses the calibration mode as determining and storing unoccupied distance values associated with unoccupied ride vehicles, in an additional or an alternative embodiment, the calibration mode may include determining and storing occupied distance(s) associated with occupied ride vehicles. To this end, during the calibration mode, fully occupied ride vehicles (e.g., occupied by the guests or by objects representative of guests) may be operated, and the control system may determine the occupied distance(s) between the ride vehicles and the first sensor. The occupied distance(s) may then be stored and may be used for comparing distances determined during the operating mode of the attraction system in order to determine the occupancy of the ride vehicles. For example, if the determined distance substantially matches the stored occupied distance(s), a determination may be made that the ride vehicle is occupied, and if the determined distance substantially deviate from the stored occupied distance(s), a determination may be made that the ride vehicle is unoccupied.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An attraction system, comprising:
 a sensor configured to emit an output signal toward a ride vehicle of the attraction system and receive a reflected signal from the ride vehicle; and
 a control system communicatively coupled to the sensor, wherein the control system is configured to:

receive data from the sensor, wherein the data is indicative of a distance of signal travel based on the output signal and the reflected signal;
compare the distance of signal travel with an unoccupied distance value corresponding to a distance between the sensor and the ride vehicle being unoccupied; and
determine whether the ride vehicle is occupied based on comparing a difference between the distance of signal travel and the unoccupied distance value with a threshold.

2. The attraction system of claim 1, wherein the control system is configured to determine the ride vehicle is occupied in response to determining the difference exceeds the threshold, wherein the threshold corresponds to a distance value for a body metric associated with a particular portion of the guest area toward which the sensor is configured to emit the output signal.

3. The attraction system of claim 1, wherein the control system is configured to determine the ride vehicle is unoccupied in response to determining the difference does not exceed the threshold.

4. The attraction system of claim 1, wherein the control system is configured to operate the attraction system in a calibration mode while the ride vehicle is an unoccupied ride vehicle, and the control system, in the calibration mode, is configured to:
instruct the sensor or a separate sensor to emit output calibration signals toward the unoccupied ride vehicle and receive reflected calibration signals from the unoccupied ride vehicle;
receive calibration data from the sensor or the separate sensor, wherein the calibration data is based on the output calibration signals and reflected calibration signals;
determine a calibration distance associated with the calibration data; and
store the calibration distance as the unoccupied distance value.

5. The attraction system of claim 1, wherein the ride vehicle is an unoccupied ride vehicle between an unloading area and a loading area, and the control system is configured to:
instruct the sensor or a separate sensor to emit output calibration signals toward the unoccupied ride vehicle and receive reflected calibration signals from the unoccupied ride vehicle;
receive calibration data from the sensor or the separate sensor, wherein the calibration data is based on the output calibration signals and reflected calibration signals;
determine a calibration distance associated with the calibration data; and
store the calibration distance as the unoccupied distance value.

6. The attraction system of claim 1, wherein the sensor is a first sensor, the data is first data, the attraction system comprises a second sensor configured to determine a positioning of the first sensor relative to the ride vehicle, the second sensor is communicatively coupled to the control system, and the second sensor is configured to transmit second data indicative of an updated positioning of the first sensor relative to the ride vehicle.

7. The attraction system of claim 6, wherein the control system is configured to:
set the unoccupied distance value to an updated unoccupied distance value based on the second data indicative of the updated positioning of the first sensor relative to the ride vehicle;
receive third data from the first sensor, wherein the third data is indicative of an additional distance of signal travel based on a second output signal from the first sensor and a second reflected signal detected by the first sensor while the first sensor is in the updated positioning relative to the ride vehicle;
compare the additional distance of signal travel with the updated unoccupied distance value; and
determine whether the ride vehicle is occupied based on the comparison between the additional distance of signal travel and the updated unoccupied distance value.

8. An attraction system, comprising:
a ride vehicle configured to travel along a ride path of the attraction system;
a sensor configured to emit an output signal toward the ride vehicle and receive a reflected signal;
a control system communicatively coupled to the sensor, wherein the control system is configured to:
receive data from the sensor, wherein the data is based on the output signal and the reflected signal;
determine a current distance of signal travel based on the data;
compare the current distance with an unoccupied distance spanning between the ride vehicle and the sensor when the ride vehicle is unoccupied; and
determine whether the ride vehicle is occupied based on the comparison between the current distance and the unoccupied distance.

9. The attraction system of claim 8, wherein the ride vehicle comprises a ride seat, and the sensor is configured to emit the output signal toward the ride seat.

10. The attraction system of claim 8, wherein the control system is configured to determine the ride vehicle is occupied in response to a determination that the current distance is less than the unoccupied distance by an amount that exceeds a threshold distance.

11. The attraction system of claim 10, wherein the control system is configured to determine a position of a guest in the ride vehicle, a size of the guest in the ride vehicle, or both, based on the output signal and the reflected signal.

12. The attraction system of claim 8, wherein the control system is configured to store information associated with occupancy of the ride vehicle based on the determination of whether the ride vehicle is occupied.

13. The attraction system of claim 8, wherein the sensor is not coupled to the ride vehicle.

14. The attraction system of claim 8, wherein the control system is configured to determine whether a restraint is engaged based on the output signal and the reflected signal.

15. A non-transitory computer-readable medium comprising executable instructions, wherein the instructions, when executed by a processor, are configured to cause the processor to:
instruct a sensor to emit an output calibration signal to an unoccupied ride vehicle moving along a ride path of an attraction system during a calibration mode of the attraction system;
receive a corresponding reflected calibration signal resulting from reflection of the output calibration signal during operation of the attraction system in the calibration mode;

receive first data associated with the output calibration signal and the corresponding reflected calibration signal from the sensor;

determine and store an unoccupied distance spanning between the sensor and the unoccupied ride vehicle based on the first data;

instruct the sensor to emit an output signal to a ride vehicle moving along the ride path of the attraction system during an operating mode of the attraction system;

receive a corresponding reflected signal resulting from reflection of the output signal during operation of the attraction system in the operating mode;

receive second data associated with the output signal and the corresponding reflected signal from the sensor;

determine a current distance of signal travel based on the second data;

compare the current distance with the unoccupied distance; and determine whether the ride vehicle is occupied in the operating mode of the attraction system based on the comparison between the current distance and the unoccupied distance.

16. The non-transitory computer-readable medium of claim 15, wherein the instructions, when executed by the processor, are configured to cause the processor to:

receive third data associated with an updated positioning of the sensor relative to the ride vehicle;

set the unoccupied distance to an updated unoccupied distance based on the third data;

determine a subsequent current distance of signal travel when the sensor is in the updated positioning relative to the ride vehicle;

compare the subsequent current distance with the updated unoccupied distance; and determine whether the ride vehicle is occupied based on the comparison between the subsequent current distance and the updated unoccupied distance.

17. The non-transitory computer-readable medium of claim 15, wherein the instructions, when executed by the processor, are configured to cause the processor to:

move the unoccupied ride vehicle along the ride path of the attraction system in the calibration mode of the attraction system; and move the ride vehicle along the ride path of the attraction system in the operating mode of the attraction system.

* * * * *